US009855659B2

(12) United States Patent
Mundt et al.

(10) Patent No.: US 9,855,659 B2
(45) Date of Patent: Jan. 2, 2018

(54) APPARATUS FOR THE AUTOMATED REMOVAL OF WORKPIECES ARRANGED IN A CONTAINER

(71) Applicant: Liebherr-Verzahntechnik GmbH, Kempten/Allgaeu (DE)

(72) Inventors: Alois Mundt, Kempten (DE); Thomas Mattern, Rieden (DE); David Haenschke, Altusried (DE); Berhard Riedmiller, Wertach (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 206 days.

(21) Appl. No.: 14/733,449

(22) Filed: Jun. 8, 2015

(65) Prior Publication Data

US 2015/0352717 A1    Dec. 10, 2015

(30) Foreign Application Priority Data

Jun. 6, 2014    (DE) .................. 10 2014 008 444

(51) Int. Cl.
  *G06F 19/00*    (2011.01)
  *B25J 9/16*    (2006.01)
  (Continued)

(52) U.S. Cl.
  CPC .............. *B25J 9/1664* (2013.01); *B25J 5/00* (2013.01); *B25J 9/0084* (2013.01); *B25J 9/0096* (2013.01);
  (Continued)

(58) Field of Classification Search
  CPC ...... B25J 9/1697; B25J 9/1679; B25J 9/1612; B25J 9/0096; B25J 9/0084; B25J 19/021;
  (Continued)

(56) References Cited

U.S. PATENT DOCUMENTS 3,765,542 A * 10/1973 White ............... H01L 21/67144
                                                    294/185
2011/0222995 A1 * 9/2011 Irie ......................... B25J 9/1687
                                                    414/225.01
(Continued)

FOREIGN PATENT DOCUMENTS

DE    102008052440 A1    4/2010
DE    202011103280 U1    12/2011
(Continued)

*Primary Examiner* — Rachid Bendidi
(74) *Attorney, Agent, or Firm* — McCoy Russell LLP

(57) ABSTRACT

The present disclosure relates to an apparatus for the automated removal of workpieces arranged in a container; having an object recognition device for detecting the workpieces and having a gripper for gripping and removing the workpieces from the container; having a control for evaluating the data of the object recognition device, for path planning and for controlling the gripper; and having a buffer station on which the gripper places the workpieces after the removal from the container, wherein the workpieces are picked up from the buffer station by a gripper and are placed down in a target placement area, with the buffer station having at least two different workpiece placement areas for placing down the workpiece in at least two different, defined placement positions.

22 Claims, 9 Drawing Sheets

(51) Int. Cl.
   *B25J 5/00* (2006.01)
   *B25J 9/00* (2006.01)
   *B25J 19/02* (2006.01)

(52) U.S. Cl.
   CPC .......... *B25J 9/1612* (2013.01); *B25J 9/1679* (2013.01); *B25J 9/1697* (2013.01); *B25J 19/021* (2013.01); *Y10S 901/02* (2013.01)

(58) Field of Classification Search
   CPC .......... B25J 5/00; B25J 9/1687; B25J 9/1674; Y10S 901/02; B23K 1/0016; H01L 21/67144
   See application file for complete search history.

(56) References Cited

U.S. PATENT DOCUMENTS

| | | | |
|---|---|---|---|
| 2012/0055975 A1* | 3/2012 | Wei | B23K 1/0016 228/6.1 |
| 2013/0085605 A1* | 4/2013 | Yasuda | B25J 9/1687 700/259 |
| 2014/0017048 A1* | 1/2014 | Mattern | B25J 9/1612 414/567 |
| 2014/0147240 A1 | 5/2014 | Noda et al. | |

FOREIGN PATENT DOCUMENTS

| | | |
|---|---|---|
| DE | 112012002677 T5 | 4/2014 |
| EP | 2364823 A2 | 9/2011 |
| EP | 2578365 A2 | 4/2013 |
| EP | 2679352 A1 | 1/2014 |
| EP | 2698234 A2 | 2/2014 |

* cited by examiner

APPARATUS FOR THE AUTOMATED REMOVAL OF WORKPIECES ARRANGED IN A CONTAINER

CROSS REFERENCE TO RELATED APPLICATION

This application claims priority to German Patent Application No. 10 2014 008 444.2, entitled "Apparatus for the Automated Removal of Workpieces Arranged in a Container", filed on Jun. 6, 2014, the entire contents of which is hereby incorporated by reference in its entirety for all purposes.

TECHNICAL FIELD

The present disclosure relates to an apparatus for the automatic removal of workpieces arranged in a container. The apparatus in particular serves to remove workpieces arranged in a container in an unordered manner and to place them in a target placement area.

BACKGROUND AND SUMMARY

The apparatus in this respect comprises an object recognition device for detecting the workpieces and a gripper for gripping and removing the workpieces from the container; a control for evaluating the data of the object recognition device, for path planning and for controlling the gripper; and a buffer station on which the gripper places the workpieces down after the removal from the container. Provision is furthermore made in this respect that the workpieces are picked up from the buffer station by a gripper and are placed down in a target placement area. The target placement area can in particular be a workpiece placement area of a transport device, a machining device and/or an assembly device.

Such an apparatus is known, for example, from EP 2679352 A1 whose content is incorporated by reference in full as a subject matter of the present disclosure. In this respect, the workpieces are removed from the container by a magnetic gripper, are placed down on the buffer station in an unordered manner and are picked up from the buffer station again with higher precision by a mechanical gripper.

An apparatus from the removal of workpieces arranged in a container in an unordered manner is furthermore known from EP 2698234 A2, whose content is incorporated in full by reference as a subject of the present application, in which apparatus the removal from the container and the placing down on a target placement area takes place directly without any interposition of a buffer station, and indeed in particular via the use of a gripper arm element which has one or two additional axes and at which a mechanical gripper is arranged.

However, to be able to remove all the workpieces from the container by means of the gripper, a number of possible gripping positions of the gripper at the workpiece must be permitted which is as high as possible and which is preferably unrestricted, in order thus to have as many degrees of freedom available with respect to the movement of the gripper. Critical parts in the container can also only be gripped in this manner. For due to the specific location of a workpiece within the container, there is typically only a very restricted subgroup of all theoretically permitted gripping positions available.

However, due to the workpiece contour and/or to the contour of the gripper, not every gripping position which could be used on gripping in the container allows an exactly positioned placing down of the workpiece at a predefined target placement area. If, however, only those gripping positions for removal from the container are permitted which allow such an exactly positioned and predefined placing down of the workpiece, a 100% emptying of the container is hereby impaired or even prevented.

It is therefore the object of the present disclosure to provide an apparatus for the automated removal of workpieces arranged in a container which, on the one hand, allows a maximum emptying of the container and, on the other hand, allows an exactly positioned, pre-oriented and/or flexible placing down of the workpiece.

This object is achieved in accordance with the present disclosure by an apparatus for the automated removal of workpieces arranged in a container that comprises an object recognition device for detecting the workpieces and a gripper for the gripping and removal of the workpieces from the container. A control is furthermore provided for evaluating the data of the object recognition device, for path planning and for controlling the gripper, as well as a buffer station on which the gripper places down the workpieces after the removal from the container. The control of the apparatus is configured in this respect such that the workpieces are picked up from the buffer station by a gripper in an automated manner and are placed down in a target placement area. The target placement area can in particular be a workpiece placement area of a transport device, a machining device and/or an assembly device. In accordance with the present disclosure, the buffer station in this respect has at least two different workpiece placement areas for placing down the workpieces in at least two different, defined placement positions. The apparatus is preferably used in this respect in accordance with the present disclosure for the removal of workpieces arranged in the container in an unordered manner.

Contrary to the prior art in accordance with EP 2679352 A2, the placing down on the buffer station thus does not take place in an unordered manner, but rather in a plurality of limited positions fixedly predefined by the workpiece placement areas. The position and alignment of the workpieces on the buffer station is hereby known after the placement thereon; no further scan is necessary. The placing down on the buffer station in particular takes place in a position and alignment defined by the respective workpiece placement areas. The gripping positions with which the workpieces can be gripped in the container are, however, less restricted than in the direct placing down of a workpiece in a single predefined target placement area due to the at least two different workpiece placement areas on the buffer station which are provided in accordance with the present disclosure. This in turn allows a better, and in one example 100%, emptying of the container.

In a possible embodiment, a maximum of one workpiece is in this respect located on the buffer station at any one time.

In an alternative embodiment, the buffer station can serve as a buffer in that more than one workpiece is placed on the buffer placement area. Such a procedure is in particular of advantage on the use of two grippers to compensate differences in the cycle times. The cycle times for the gripping in the container and the placing down on the buffer station can in this respect vary considerably depending on the gripping point at the workpiece in the container and on the position of the workpiece in the container. In this respect, in dependence on the workpiece just to be gripped, the picking up from the buffer station and the placing down in the target placement area can in particular take place more slowly than the gripping in the container and the placing down on the buffer station. More than one workpiece can in particular be placed down on the buffer station in phases in which the cycle time for the gripping from the container is smaller than the cycle time for the placing down on the target placement area which are picked up in phases in which the cycle time for the gripping from the container is greater than the cycle time for the placing down on the target placement area.

The buffer station advantageously has more workpiece placement areas for this purpose than would be necessary for the placing down of a workpiece having arbitrary gripping points. The buffer station can in particular comprise at least two examples of every kind of workpiece placement area. The buffer station can in this respect also at least have separate subunits of which each considered per se could serve as a buffer station in accordance with the present disclosure for a workpiece.

The gripping of the workpieces in the container in this respect advantageously takes place with a plurality of different permitted gripping positions. All the gripping positions with which the gripper can grip a workpiece are permitted in this respect. The emptying is hereby improved. The buffer station in this respect can have so many different workpiece placement areas that at least one workpiece placement area at which the workpiece can be placed down on the buffer station is available for substantially every permitted gripping position on the gripping of the workpieces in the container.

The selection of the workpiece placement area of the buffer station used for the placing down in this respect optionally takes place on the basis of the gripping position with which the workpiece is or was removed from the container.

In a possible embodiment in this respect, the workpiece placement area in which the workpiece is placed down on the buffer station is already determined before or during the gripping of a workpiece in the container so that the available workpiece placement areas can already enter into the selection of the gripping position for gripping in the container.

In a preferred embodiment, the selection of the workpiece placement area used for the placement in contrast only takes place when a gripping of the workpiece in the container has taken place. The time which is required for the removal of the workpiece from the container can hereby be used for the determination of the workpiece placement areas usable for placement and for selecting the workpiece placement area.

In a possible embodiment of the present disclosure, the selection of the workpiece placement area in this respect takes place on the basis of a predefined association between specific gripping positions and specific workpiece placement areas. A plurality of predefined gripping positions at which the workpieces can be gripped can in particular be defined at the workpiece. They may be associated with one or more workpiece placement areas which can generally receive a workpiece gripped in such a gripping position. The selection can in particular take place between the gripping positions and the workpiece placement areas via a query of an association table stored in the control.

Provision can furthermore be made in accordance with the present disclosure that the gripping of the workpieces in the container takes place using a plurality of different permitted gripping points. Such permitted gripping points can then be associated with specific workpiece placement areas as described above.

It is furthermore possible that the gripping of the workpieces in the container can also take place in permitted gripping regions extending about such gripping points. A specific offset with respect to certain gripping points can in particular be allowed in the gripping.

A predefined association between permitted gripping regions and workpiece placement areas can also be used here for selecting the workpiece placement area.

Alternatively or additionally, however, a collision test can also take place in which a check is made using a geometrical model whether a collision-free placing down of a workpiece gripped in a specific gripping position on a workpiece placement area of the buffer station is possible. The collision test can in this respect take place before the gripping of the workpiece in the container. It is thus avoided that a gripped workpiece cannot be placed down on the buffer station and has to be placed back down in the container again. In an alternative embodiment, this collision test takes place in contrast after the gripping of the workpiece in the container. The time in which the workpiece is removed from the container can hereby be utilized to carry out the collisions test. In a further preferred embodiment, the collision test can take place in parallel with the gripping process to reduce cycle times.

In a particularly preferred embodiment, a selection of the workpiece placement areas on which a placing down is potentially possible first takes place in this respect by a predefined association between permitted gripping points or permitted gripping regions and the workpiece placement areas. A collision test is optionally arranged downstream of this which checks whether a collision-free placing down on at least one of the workpiece placement areas is actually possible. If this is not the case, the workpiece may be not gripped or is placed down in the container again.

In the collision test, a geometrical model of both the buffer station and of the gripper and the workpiece can be used in this respect in order reliably to recognize collisions on the placing down of a workpiece on the buffer station.

A sensor can furthermore be provided which determines the gripping position of the gripper after the gripping in the container and before the placing down on the buffer position. A change in the gripping position intended on the gripping in the container can hereby be recognized which can be caused, for example, by a slipping of the workpiece at the gripper. The selection of the workpiece placement area on the buffer station and/or the collision test optionally takes/take place on the basis of the gripping position determined by the sensor. A camera or a laser distance sensor can be used as the sensor, for example. The sensor is optionally arranged at the buffer station, wherein the gripper first moves the workpiece into the region of the sensor after the taking out of the container before a placing down on the buffer station takes place. The sensor can further optionally be arranged between the container and the buffer station.

In a possible embodiment of the present disclosure, a decision is made in dependence on the gripping position with which the workpiece was gripped in the container as to whether the workpiece is first placed down on the buffer station in order to be picked up from there again or is placed down directly at the target placement area. Some gripping points can be provided in this respect at which a direct placing down on the target placement area takes place and other gripping points can be provided which make a placing down on the buffer station necessary. The decision can in this respect take place in a possible embodiment after the gripping position was determined via a sensor.

Specific gripping points on the gripping in the container can furthermore optionally be selected, in particular those which require a direct placing down on a target placement area or a smaller cycle time on the placing down and picking back up on the buffer placement area than other gripping points and/or gripping points which allow a secure gripping. If therefore a plurality of workpieces are present in the container which have to be gripped, the selection of the actually gripped workpiece advantageously takes place with reference to the respective available gripping points.

In accordance with the present disclosure, the picking up of the workpiece from the buffer station optionally takes place with fewer permitted gripping positions than the gripping in the container. The buffer station thus provides a reduction of the permitted gripping positions. The workpiece can in this respect may always be gripped from the buffer station with a gripping position which allows a clear, predefined placing down in a target placement area. The gripping from the buffer station in this respect allows the placing down of all workpieces in a single predefined position and/or alignment and/or at a single type of target placement area.

The picking up of the workpiece from the buffer station in this respect may only take place with a single gripping position or with the gripping positions which permit a final placing down in the end position.

In a possible first embodiment of the present disclosure, the same gripper is used for gripping the workpieces from the container and for the removal from the buffer placement area.

Alternatively, two separate grippers are used for gripping the workpieces from the container and for picking them from the buffer placement area. The use of two separate grippers in this respect increases the cycle speed since the first gripper is already again used for gripping a workpiece from the container while the second gripper is picking up a workpiece from the buffer placement area and is placing it down at the target placement area. The two separate grippers are in this respect optionally moved by separate gripping arms.

In accordance with the present disclosure, the gripper for gripping the workpieces in the container and/or for picking them up from the buffer placement area can be a magnetic gripper, a pneumatic gripper or a mechanical gripper, optionally also a combination of these options, particularly optionally a mechanical gripper. Such a mechanical gripper allows a higher gripping precision. It can in particular be a finger gripper or a jaw gripper. The gripper is in this respect optionally arranged cropped at the gripper arm or at a gripper arm extension. The gripper can in particular be configured as is known from EP 2679352 A1 for the gripper for removing the workpieces from the buffer station and as is known from EP 2698234 A2 for the gripper for the removal of workpieces from the container. It can in particular be a two-finger gripper. If in this respect two separate grippers are used for gripping the workpieces in the container and for removing them from the buffer station, identically designed grippers can be used for this purpose in a possible embodiment. However, different grippers are optionally used since higher demands are to be made on the gripper for the gripping in the container than those for the picking up from the buffer station.

The gripping of the workpieces from the container takes place in accordance with the present disclosure using the data of an object recognition device. Any desired system which allows the identification of the workpieces and the selection of a workpiece suitable for gripping can generally be used as an object recognition device.

If the position of the workpieces in the container is known in advance, for example because they are arranged in order in the container, the object recognition device can optionally also only take place using such already known positional data.

The detection of the workpieces, however, advantageously comprises a data logging by a measurement process. An identification of the individual workpieces in the detection zone from which a workpiece suitable for gripping is selected then takes place by evaluating the data. The possible gripping positions with which such a workpiece can be gripped are optionally determined in this respect and a gripping position suitable for gripping is selected. The movement of the gripper or of the gripping arm moving it is then planned on the basis of the position data of the workpiece and on the selected gripping position. In this respect, a collision test can be carried out so that a movement routine is selected in which the gripper or the gripping arm does not collide with interfering edges such as the other workpieces and/or the side walls of the container. The gripper or the gripping arm is then controlled using the data thus calculated.

In this respect, in particular optical sensors are used as the object detection device, with in particular laser sensors and/or image sensors being able to be used. The sensors can in this respect work in two dimensions, two-and-a-half dimensions or three dimensions. A 3D laser scanner may be used in this respect.

The object recognition device for detecting the workpieces in the container is in this respect optionally arranged in its measurement position above the container.

The detection of the workpieces, the track planning and the gripping and removal of the workpieces from the container can in particular take place such as is known from EP 2698234 A2 and/or EP 2679352 A1

In a possible embodiment of the present disclosure, a repeat object recognition of the workpiece can take place on the buffer station so that the picking up of the workpiece from the buffer station takes place on the basis of this repeat object recognition.

In accordance with a preferred embodiment of the present disclosure, the picking up of the workpiece from the buffer station takes place, however, on the basis of the known position of the used workpiece placement area and on the known shape of the workpiece. The picking up in this respect may take place without a previous object recognition of the workpiece on the buffer station or at least with a less complex object recognition than with the gripping in the container. The cycle time can hereby be reduced.

The buffer placement area can, in accordance with the present disclosure, comprise an adjustment arrangement which allows a change of the position and/or alignment of a workpiece placed on the buffer placement area and/or of a placing element. The position and/or alignment of the workpiece at the buffer station after the placing down can hereby be changed or a placing element can be traveled away from the workpiece to release a gripping point.

The positional change of the workpiece and/or of a placing element thus optionally allows the picking up of the workpieces with a gripping point which was not available in the placement position. A gripping switch on the buffer station can hereby take place, i.e. the picking up can take place using a different gripping point.

The adjustment arrangement is in this respect optionally used to move the workpiece from the placement position in which it was placed down on the buffer station into a defined pick-up position. In this pick-up position, the workpiece is optionally gripped to be placed down on a target placement area.

A workpiece which was placed down gripped at an inner contour can in this respect, for example, be moved by the adjustment arrangement into a pick-up position which allows a gripping at an outer contour, or vice versa.

The adjustment arrangement can in this respect carry out a rotation, a pivoting and/or a displacement of the workpiece. In a possible embodiment, a linear displacement of the workpiece is carried out in this respect.

Provision can in particular be made in this respect to travel the workpieces into one or more defined pick-up positions. Provision can in particular be made in this respect that the adjustment arrangement can nevertheless travel workpieces which were placed down into different workpiece placement areas into an identical pick-up position. Fewer pick-up positions than workpiece placement areas are optionally provided in this respect. Only one or two pick-up positions can in particular be provided in this respect.

The buffer station may be structured such that the position of at least one of the workpiece placement areas is kinematically adjustable. In particular, at least one drive can be provided via which the adjustment takes place. The adjustment can in particular take place on the basis of the gripping position with which the workpiece is or was removed from the container. The respectively used workpiece placement area can in particular be traveled into a placement position and/or into a pick-up position. The traveling of the workpiece placement area can take place before the placing down on the buffer station or during or after the placing down has taken place.

The traveling of the workpiece placement area can in particular be used, despite the placing down of the workpieces in different workpiece placement areas, to be able to place them in a coinciding placement position and/or orientation and/or to be able to pick up the workpieces from the buffer station in only one pick-up position despite the placing down in different workpiece placement areas.

In accordance with the present disclosure, the buffer station can have at least one kinematically adjustable placing element. In this respect at least one drive can in particular be provided via which the adjustment takes place. The kinematic adjustment of the placing element can in this respect be used for different purposes.

It is, for example, conceivable to provide at least two different workpiece placement areas by an adjustment of the placing element. A placement region can in particular be shifted from a first workpiece placement area into a second workpiece placement area by the adjustment of a placing element. The adjustment of the placing element then optionally takes place in dependence on the gripping position of the workpiece.

Alternatively or additionally, the travelable placing element can provide an adjustment arrangement which, as described above, travels a workpiece into a pick-up position after the placing down on the buffer station.

Alternatively or additionally, a gripping point can be exposed at the workpiece by the traveling of the placing element, with which gripping point the workpiece can then be picked up from the buffer station.

In accordance with the present disclosure, the buffer station can have at least one nest into which a workpiece can be placed and it can have at least one pin on which a workpiece can be placed. The nest can in particular have side walls and placement points, with the side walls at least partly surrounding the peripheral contour of the workpiece. The side walls can in particular be arranged at a slant in order thus to allow a centration of the workpiece in the nest. The pin may be configured such that the workpiece can be placed onto the pin using a cut-out and/or an inner contour. The placing can optionally take place on a plurality of pins which accordingly form a workpiece placement area.

The buffer station can comprise a plurality of different nests and/or a plurality of different workpiece placement areas formed by pins.

A plurality of identical nests and/or a plurality of identical pins can furthermore be provided. A buffer function of the buffer station can hereby be provided.

An optimization of the cycle times can take place by the use of the buffer station as a buffer since, depending on the gripping positions present at the workpiece and on predefined placing positions, the cycle time of the gripping into the container can vary and the pick-up and positioning into a predefined end placement area can be faster than the container removal. The cycle times then have to be coordinated with one another and the buffer station configured in accordance with the present disclosure can act as a buffer and prevent a standstill of the plant or a waiting of the individual operations for one another.

At least one pin can optionally be travelable. The travelability of such a pin can in particular be used to provide different workpiece placement areas. The position of a first pin can in particular be variable with respect to a second pin.

Alternatively or additionally, the travelability of the pin can allow a raising of a workpiece placed into a nest on the pin and/or a lowering of a workpiece placed on the pin into a nest. Despite the possibility of placing on the pin or into the nest by a corresponding traveling of the pin, this allows only one pick-up position to be provided for these two placement possibilities. The pin is in this respect optionally arranged beneath the nest and can be moved through an opening in the region of the base area of the nest and can be brought into engagement with the workpiece.

In a preferred embodiment of the present disclosure, the buffer station has at least two nests and/or at least two pins. The two pins can in this respect optionally be adjustable with respect to one another in order hereby to provide two different workpiece placement areas. Alternatively or additionally, each of the two nests can be travelable over the pin or pins such that a raising of a workpiece placed into the nest or a lowering of a workpiece placed on the pin or pins into the nest can take place.

The nests are in this respect advantageously arranged on a carriage by means of which the nests can be traveled over the pin or pins. A lift drive is in this respect further optionally provided via which the pin or pins are adjustable with respect to the nests or with respect to one another. Two lift drives, in particular electrical cylinders, pneumatic cylinders or hydraulic cylinders, are in this respect optionally provided, with the one lift drive allowing a raising of the pins with respect to the nests and the other allowing an adjustment of the positions of the pins.

A pick-up of the workpieces from the buffer station may take place only from a position in which the workpieces lie on the pins or only from a position in which the workpieces lie in a nest. The picking up is optionally from a position in which the workpieces lie on the pins since the lying on the pins brings about smaller positional deviations.

In accordance with the present disclosure, the gripper for gripping the workpieces from the container and/or for picking up from the buffer placement area is optionally moved by a gripper arm. If two separate grippers are provided in this respect, two separate gripping arms are also optionally used.

The gripping arm is advantageously a robot arm of a six-axis robot. Alternatively, it can be a gripping arm arranged at an area gantry or at a linear gantry.

The gripping arm optionally has a gripping arm element having at least one, and optionally two additional axes. The gripping arm and the gripping arm element are optionally configured as is shown in EP 2698234 A2.

If two separate grippers are used for the removal of the workpieces from the container and for picking them up from the buffer station, at least the gripper for the removal of the workpieces from the container is optionally moved via a robot arm or via an area gantry or linear gantry which, as shown above, optionally has a gripping arm element having one or optionally two additional axes.

In a possible embodiment, the second gripper used for picking up the workpieces from the buffer station can also be moved via such a gripping arm.

However, the gripping tasks for the second gripper used for picking up are by no means as complex as that for the gripping from the container. The gripper for picking up the workpieces from the buffer station can therefore also be moved by a simple transport device having only one or two linear or rotary axes. Alternatively, the use of a robot arm, in particular of a six-axis robot, is also conceivable, but without a gripping arm element having additional axes.

The apparatus in accordance with the present disclosure optionally has a control by which the above-described procedures and steps are carried out automatically. If it was described in this respect with regard to the configuration of the apparatus that it can be used for a specific mode of operation, a control is optionally provided via which this mode of operation is automatically implemented.

The apparatus can in this respect have a first control component by which the control of the gripper on the removal of the workpieces from the container and on the placing down on the buffer placement area takes place and/or can have a second control component via which the control of the gripper on the pick-up from the buffer placement area and on the placing down on the target placement area takes place.

The first control component in this respect optionally calculates the movement of the gripper in dependence on the selected gripping point and/or on the workpiece placement area provided for the placing down on the buffer station. The calculation can take place at least partly or completely in a period after the gripping of the workpiece in the container and while the gripper having the workpiece is already being moved in the direction of the buffer station.

In this respect, the first control component can move the gripper after the picking up of a workpiece from the container in the direction of or toward a predefined transfer position from where the further movement of the gripper for placing down on the buffer station takes place. The complete path of the gripper up to the placing down on the buffer station hereby does not yet have to be known on the gripping in the container. The movement of the gripper from the transfer position to the placing down on the buffer station can rather be calculated while the gripper is moving from the pick-up of the workpiece in the container to the transfer position. The path can optionally be divided into a plurality of regions and accordingly a plurality of transfer positions can be provided.

The first control component can comprise a passive and an active control part, wherein a track planning for the movement of the gripper takes place by the passive control part, in particular in dependence on the gripping position, while the active control part controls the kinematics for moving the gripper and in particular a robot arm used for this purpose with reference to the track planning.

The second control component in contrast optionally moves the gripper on one or more predefined tracks stored in the control.

Provision can furthermore be made that the first control component also controls the gripper, in dependence on the gripping point and/or on the gripping quality, up to the direct placing down of the workpiece on the target placement area so that the second control component would not be used for such a workpiece. One or more predefined transfer positions can here also advantageously be provided within the movement routine.

The present disclosure furthermore comprises a buffer station for an apparatus such as was described above. The buffer station in accordance with the present disclosure has at least two different workpiece placement areas for the placing down of the workpiece in at least two different, defined placement positions.

The buffer station is optionally configured such as was already described above with respect to the apparatus in accordance with the present disclosure. The buffer station can in particular have a kinematically adjustable workpiece placement area and/or a kinematically adjustable placing element. In this respect at least one drive can in particular be provided via which the adjustment takes place.

In addition to the apparatus in accordance with the present disclosure, the present disclosure furthermore comprises a method for the automatic removal of workpieces arranged in a container. The method in this respect comprises the steps:
detecting the workpieces;
gripping at least one workpiece using a gripper,
removing the workpiece from the container,
placing down the workpiece on a buffer station; and
gripping the workpiece using a gripper and picking up the workpiece from the buffer station.

Provision is made in accordance with the present disclosure that the workpieces are placed down, after the removal from the container, in at least two different, defined placement positions on the buffer station. The placement position with which the workpieces are placed down on the buffer station can in particular be selected in dependence on a gripping position of the gripper on the gripping of the workpiece in the container. In this respect, more gripping positions are optionally permitted for gripping the workpiece in the container than on the gripping of the workpiece from the buffer placement area.

The workpiece is optionally positioned from the buffer placement area in a target placement area. For example, it can be a transport path, a store, a nest or the receiver of a processing machine. For example, a belt without specifically predefined reception zones can be used as an end receiver, with in this case the workpieces optionally being placed on the belt in a predefined pattern.

The method in accordance with the present disclosure is optionally carried out such as was already described above with respect to the apparatus in accordance with the present disclosure. The method in accordance with the present disclosure further optionally takes place using the apparatus in accordance with the present disclosure.

The present disclosure will now be described in more detail with reference to an embodiment and to drawings.

BRIEF DESCRIPTION OF THE FIGURES

FIGS. 2-8 are drawn to scale, although other relative dimensions may be used, if desired.

DETAILED DESCRIPTION

Figure 1:
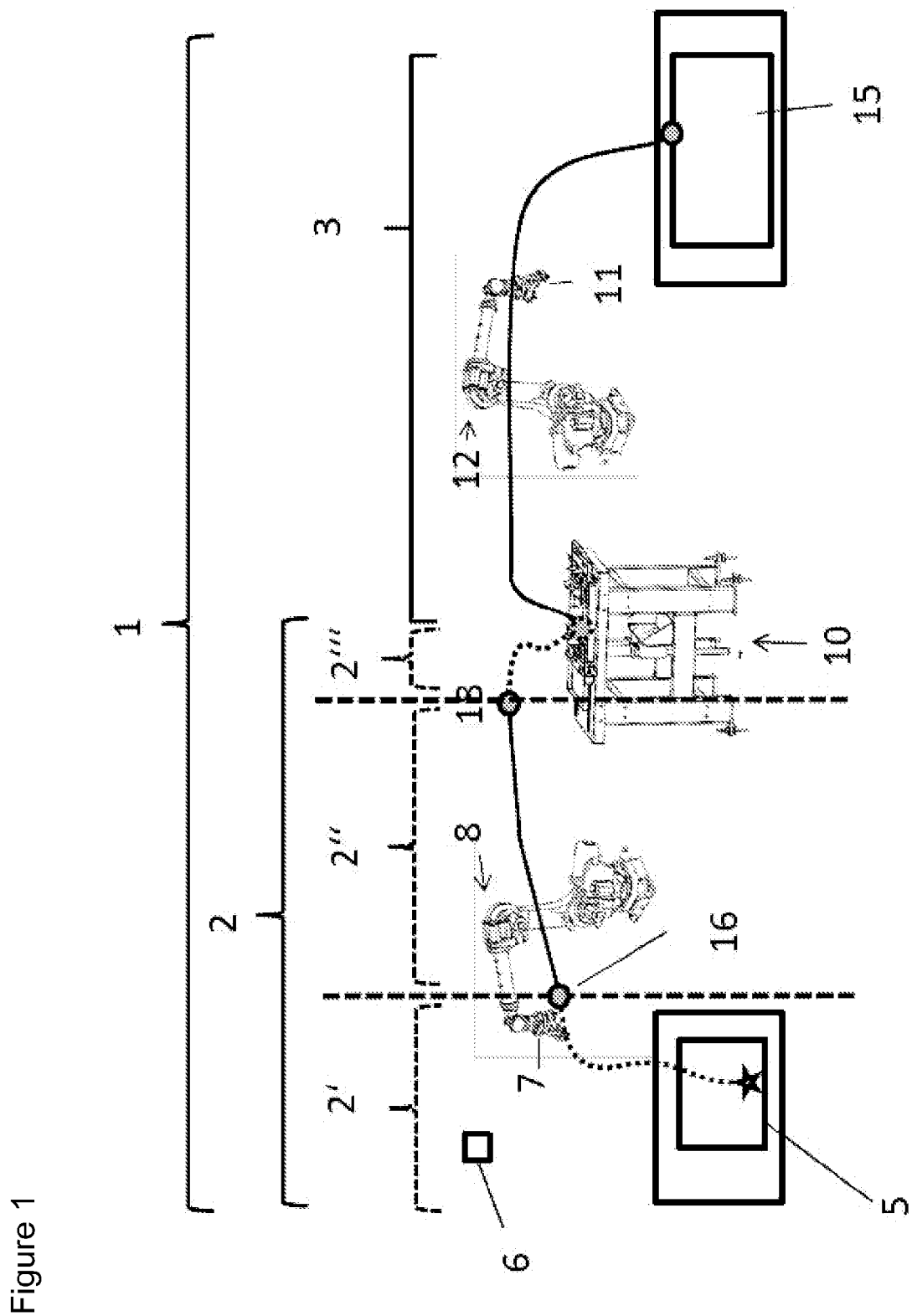
FIG. 1 shows a schematic drawing of an embodiment of an apparatus in accordance with the present disclosure for the automated removal of workpieces arranged in a container.

FIG. 1 shows an embodiment of an apparatus in accordance with the present disclosure for the removal of workpieces from a container 5. The workpieces can in particular be arranged in the container 5 in an unordered manner.

A detection unit 6 is provided in this respect which detects the workpieces located in the container. It can in particular be a laser scanner, in particular a 3D laser scanner. The detection unit is arranged vertically above the container and so looks into it (where the vertical dashed lines of FIG. 1 are in the vertical direction, which is with respect to gravity). In accordance with the present disclosure, a control component 2 is provided in this respect which evaluates the data generated by the detection unit 2. The workpieces located in the container are identified and a workpiece suitable for gripping is selected. A track planning for the trajectory of the gripper 7 then takes place using the positional data of the selected workpiece.

The gripper 7 is moved in the embodiment shown in FIG. 1 via an industrial robot 8 whose robot arm has six axes. A gripper arm element which has two further axes of movement can in this respect optionally additionally be arranged at the end of the robot arm. The gripping arm element can in particular be designed such as is known from EP 2698234 A2.

Irrespective of the question of the movement of the gripper, it is optionally designed as a mechanical gripper in particular as a finger gripper or as a jaw gripper. A two-finger gripper is in this respect used in the embodiment. The mechanical gripper used in accordance with the present disclosure in this respect allows a more precise gripping of the workpieces.

The apparatus in accordance with the present disclosure comprises a buffer station 10 on which the workpieces gripped by the gripper 7 and removed from the container 5 can be placed down. A gripper 11 is provided via which the workpieces are gripped on the buffer station and are removed from it to be placed down at the target placement area 15. The gripper 11 is attached to the robot arm of an industrial robot 12, the robot arm having six axes of movement.

The control on the removal of the workpieces from the container 5 and on the placing down on the buffer placement area takes place via a first control component 2 and on the picking up from the buffer placement area 10 and on the placing down on the target placement area 15 by a second control component 3. In particular, the first control component 2 controls the gripper 7 and the robot 8, and the second control component 3 controls the gripper 11 and the robot 12. The buffer station 10 and in particular the travel arrangement of the buffer station 10 is controlled by a further control component 10'.

Transfer positions 16 and 18 can be defined which separate different control zones from one another. The movement of the gripper 7 within these control zones is controlled by the second control component 2. The control component 2 can have corresponding subroutines 2', 2'' and 2''' for the control within these control zones. The subroutine 2' is responsible for the gripping in the container 5 and for the removal of the workpieces from the container. The subroutine 2' is programmed such that the gripper is moved, after gripping and removing a workpiece from the container, to a predefined first transfer position 16. The subcomponent 2'' takes over control of the gripper 7 and the robot 8 at the first transfer position 16 and is programmed to move the gripper on a predefined track from the first transfer position 16 to the second transfer position 18. The subcomponent 2''' The subcomponent 2''' takes over the control of the gripper 7 and the robot 8 at the second transfer position 18 and is programmed to place down the workpiece gripped by the gripper on the buffer station 10. The movement paths of the gripper 7 within the three control zones can thereby be calculated independently of one another. The movement to the first transfer point 16 can in particular already take place while the movement path from the second transfer point 18 to the buffer station is still being calculated.

The first control component 2 thus controls the traveling of the gripper to the workpiece and gripping the workpiece in a first step. There is at least one theoretical transfer point predefined within the first control control component. The workpiece is gripped in the first step, but the first control component at this moment does not yet know where the workpiece can be placed down. This calculation only now takes place. In particular, a target point on the buffer placement area is determined and a corresponding track planning for the control of the gripper from the transfer point to the target point on the buffer station is performed.

The determination of the target point on the buffer placement area is performed by the control unit 10'. The control 10' may comprise a look-up table comprising a plurality of predefined placement points and information whether they can be used with predefined gripping positions of the gripper on the workpiece. The control 10' chooses a placement point from the stored look-up table as the target point on the basis of the actual gripping position. On the basis of the target point, the control unit 2''' calculates a track for the gripper 7. The control 10' further controls a travel arrangement of the buffer station 10 to provide a placing area corresponding to the chosen target point. The control 10' receives information on the actual gripping position from the first control unit 2 controlling the gripper 7 and provides the first control unit 2 with information on the target point.

In one embodiment not shown, the control 10' may be part of the second control unit 2. Further, the determination of the target point on the buffer placement area and the corresponding track planning take place in a passive part of the control unit. On the basis of the target point, the passive part of the control unit calculates a track for the gripper 7. An active part of the control receives this track and controls the gripper 7 and the robot 8 over the track received from the passive part of the control unit.

The first control component 2 thus may include a passive component and an active component. The passive control calculates the exact gripping points and target points and also calculates the track planning therefrom and the active control represents the actual robot control with its monitoring work and simply travels through the predefinitions from the passive part.

The second control component 3 is responsible for the picking up from the buffer station via the gripper 11 and for the placing down on a target placement area. The control takes place here with reference to a predefined movement routine since the pick-up position and the target placement position are predefined. One of a plurality of predefined movement routines can optionally be used in this respect in dependence on the workpiece placement area from which the workpiece is picked up. The same applies when a plurality of target placement areas are serviced. The second control component thus only makes a pick-and-place from the buffer station onto the target placement area since it works with one or more fixedly predefined gripping points on the buffer station.

If a direct placing down is possible on an optimum gripping in the box with respect to a target placement area, the first control component takes over the control completely and also places down. The second control component is not used in this case.

The control components 2 and 3 are in this respect integrated in a higher ranking control 1. The control components 2 and 3 may be provided as control routines programmed to perform the control steps described above. Other divisions of the individual control components and control work are also conceivable.

In the embodiment shown in FIG. 1, a separate gripper 11 is used for picking up the workpieces from the buffer placement area 10 and is moved via a separate gripping arm 12. In the embodiment, an industrial robot having six axes is likewise used in this respect for moving the second gripper 21. The use of an additional gripping arm element having additional axes is, however, not necessary as a rule here. Alternatively to an industrial robot, a simple translation device having only one or two linear or rotary degrees of freedom could also be used.

Alternatively to the embodiment shown in FIG. 1, the same gripper 7 which is used for removing the workpieces from the container 5 is also used for gripping and picking up the workpieces from the buffer station 10. In this case, the second control component 3 controls the first gripper 7 and the robot 8 for taking up workpieces from the buffer station 10. The use of two separate grippers, however, reduces the cycle times since a new workpiece can already be gripped from the container in the time period in which the picking up of a workpiece from the buffer station takes place.

The target placement area 15 only drawn schematically in FIG. 1 can, for example, be a nest into which the workpieces are placed or it can be a plurality of nests arranged on a transport device, for example. Alternatively, the workpieces can, for example, also be placed down in a predefined pattern on a transport device, for example on a belt. The target placement area can furthermore be a store or the receiver of a processing machine.

The buffer station 10 in accordance with the present disclosure in this respect allows the workpieces in the container 5 to be gripped with a number of permitted gripping points which is as large as possible and nevertheless to allow a precise placing down of the workpieces in a fixed predefined position and/or alignment in the target placement area 15. The workpieces can in particular be gripped in the container 5 with gripping positions which would not allow such a defined placement in a predefined position and/or alignment in the target placement area 15.

The buffer station for this purpose has at least two different workpiece placement areas for placing down the workpiece in at least two different, defined placement positions. The workpieces are hereby, on the one hand, placed down in fixedly defined positions on the buffer placement area so that they can be picked up from the buffer station without a further object detection. The buffer station, however, not only offers a fixedly defined placement possibility such as is typically the case in the final pick-up, but at least two such placement possibilities. The buffer station in this respect further optionally offers at least three, optionally at least four, such alternative, defined placement positions and accordingly at least three, and further advantageously at least four, different workpiece placement areas.

Due to the plurality of placement possibilities on the buffer station, the workpieces in the container 5 can be gripped with more permitted gripping positions than if only one defined placement possibility were present. The gripping and picking up of the intermediate pieces from the buffer station then optionally takes place using one or two defined gripping positions so that the workpiece can be placed down at the target placement area in only one fixedly predefined placement position and/or placement alignment.

Figure 2:
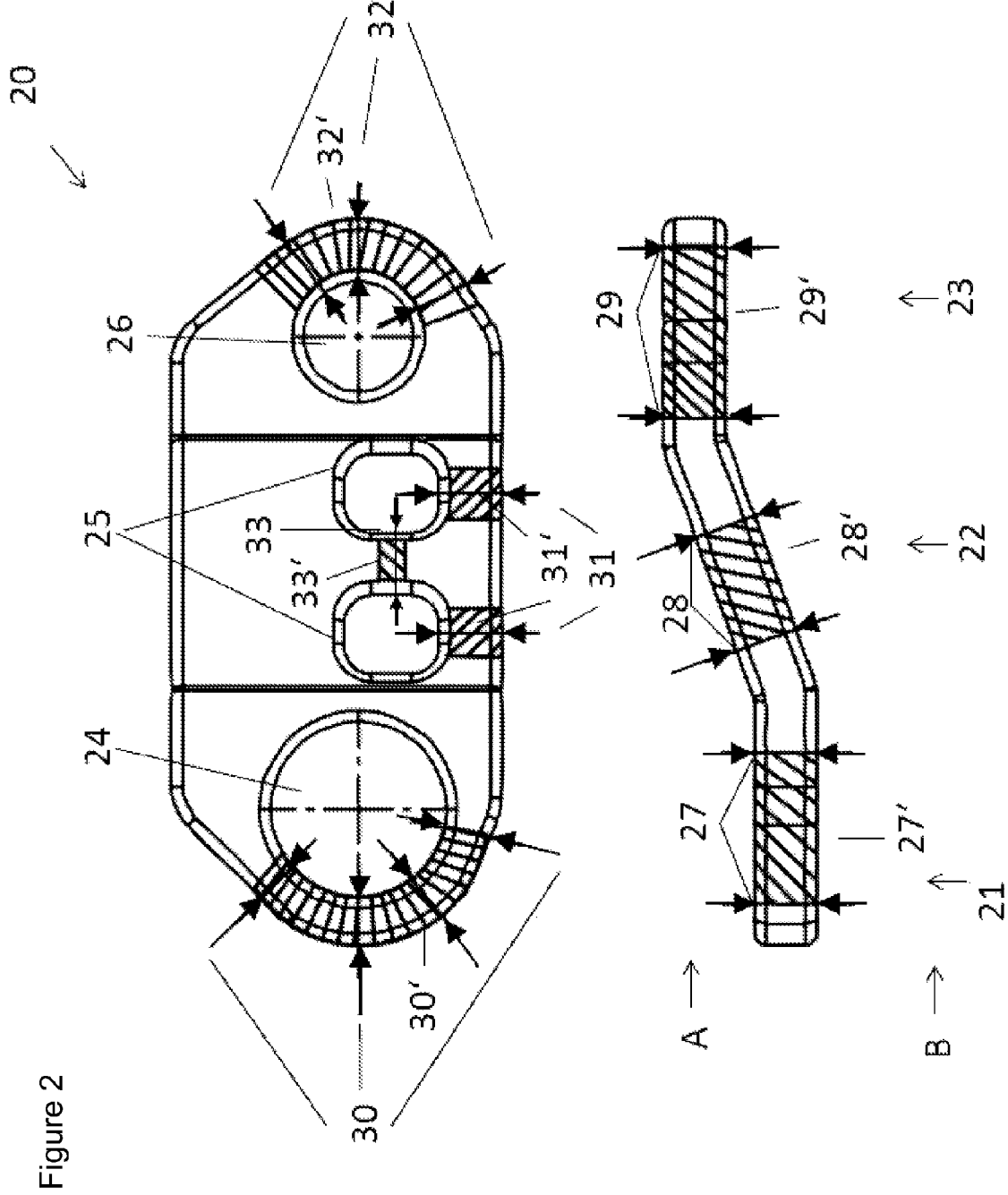
FIG. 2 shows an embodiment of a workpiece which is handled by the apparatus in accordance with the present disclosure, with the possible gripping positions.

An embodiment of an exemplary workpiece 20 is in this respect shown in a side view and in a plan view in FIG. 2. The possible gripping positions of a gripper at the workpiece will be illustrated in more detail by this exemplary workpiece. The possible gripping positions are in this respect caused by the geometry of the workpiece, on the one hand, and by the design of the gripping element, on the other hand.

The exemplary workpiece 20 shown in FIG. 2 in this respect has an elongated, flat shape with a left region 21, a middle region 22 and a right region 23 which are configured planar per se and which are connected to one another via angled portions. The workpiece furthermore has openings 24 to 26. The workpiece can now be gripped at the side or at the front via a finger gripper which engages at the upper side and lower side of the workpiece in the region of the planar regions 21 to 23. The possible gripping positions 27 to 29 are shown here. These gripping positions 27 to 29 are, however, here not singular gripping points, but rather gripping regions 27' to 29' which extend about or between the permitted gripping points.

The workpiece can be gripped from above or from below in that one of the gripping fingers of the gripper engages into the openings 24 to 26 of the workpiece while the other engages at the outer periphery. Gripping positions 30 to 32 hereby result which are in turn expanded to gripping regions 30' to 32'. A gripping position in which both fingers pass through the openings 24 to 26 is given by the gripping position 33 or the gripping region 33'.

The apparatus in accordance with the present disclosure is now configured such that, on the gripping of the workpieces from the container 5, a large number of the gripping positions or all the gripping positions which are possible with respect to the geometry of the workpiece and the configuration of the gripper are also stored as permitted gripping positions in the control. A plurality of gripping positions are hereby available for gripping the workpieces in the container so that generally always at least one workpiece lies in the container such that it can also actually be gripped with a permitted gripping position. This procedure in particular allows a 100% emptying of the container.

Due to the plurality of gripping positions with which the workpiece can be gripped in the container, however, a direct placing down of the workpieces in only one single pre-defined alignment and/or position at the target placement area is not possible or is at least not directly possible in every case. It is, however, ensured by the at least two different defined placement positions provided by the buffer station that a workpiece gripped in the container can also actually be placed down on the buffer placement area in a defined manner. The selection of the workpiece placement areas of the buffer station used for placing takes place in this respect in dependence on the gripping position used for gripping.

An association between the possible gripping positions of the workpiece on the gripping in the container and the usable workpiece placement areas on the buffer station is in this respect optionally stored in the control 3. This can in particular take place in the form of a table which associates corresponding workpiece placement areas with the gripping positions 27 to 32 and 30 to 32. The table is in this respect optionally stored in the first control component 2 and in particular in the passive part of this control component.

However, as illustrated with reference to FIG. 2, the permitted gripping positions are not necessarily singular points so that it cannot be precluded solely by the association of the permitted gripping regions with specific workpiece placement areas that collisions nevertheless occur. The permitted gripping regions can in particular be defined via an offset with respect to a permitted gripping position arranged within the region.

To ensure that a collision-free placing down of a workpiece on the buffer station is possible, the embodiment of the control 10' in accordance with the present disclosure therefore comprises a collision observation module. It includes a 3D module of the gripper, of the workpiece and of the buffer placement area and calculates with reference to the specific gripping position, i.e. with reference to the offset from a predefined gripping point in the embodiment, whether a collision-free placing of the workpiece on the buffer placement area associated with this gripping point is possible.

If the collision observation shows that such a collision-free placing down is not possible, the workpiece is again placed down in the container 5 and is gripped again.

The collision observation in accordance with the present disclosure in this respect optionally takes place in real time while the gripped workpiece is being removed from the container via the gripper 7. Cycle time is hereby saved since the calculation does not already have to be present before the gripping.

The buffer position can furthermore have a sensor, not shown, which determines the gripping position of the gripper after the gripping in the container 5 and before the placing down on the buffer position. A change in the gripping position intended on the gripping in the container can hereby be recognized which can be caused, for example, by a slipping of the workpiece at the gripper. If such a sensor is used, the selection of the workpiece placement area on the buffer station and/or the collision test takes/take place on the basis of the gripping position determined by the sensor. The collision observation could hereby be carried out with even more precise data. A camera or a laser distance sensor can be used as the sensor, for example.

Provision can be made in this respect that the workpieces picked up at the gripper before the placing down of the workpieces on the buffer station are traveled into the region of the sensor to determine the exact position of the workpiece at the gripper. Alternatively, a sensor arranged at the gripper itself could be provided for this purpose or a sensor could be arranged between the container and the buffer placement area.

The following procedure is followed in this respect with regard to the design of the gripper, of the buffer station and of the control First, the maximum possible number of gripping points is fixed with reference to the workpiece to be gripped. The gripper design, i.e. the specific embodiment of the gripper, takes place based on this.

The functions which the buffer station has to provide are defined on the basis of the gripping points. They are, on the one hand, the number and the structure of the workpiece placement areas and, on the other hand, functions for the provision of other gripping points for the workpieces on the buffer station such as the rotation, pivoting, dressing of workpieces and/or workpiece placement areas.

Preferred gripping points are defined with respect to the design of the control, in particular with reference to the mechanical properties such as stability in the gripper and/or the cycle time and the situation on the buffer station. These gripping points are optionally used on the gripping in the container. If the workpiece can be gripped via a preferred gripping point, a bypass of the buffer station is potentially possible in this respect.

Substitute gripping points or gripping regions are furthermore defined which are used if no workpiece can be gripped with a preferred gripping point. A strategy for parts handling is prepared accordingly and the association between gripping points and the placing down and handling on the buffer station is in particular defined.

The category of the gripping points in this respect has an influence on the design of the grippers and on the construction design of the buffer station.

A plurality of identical nests and/or a plurality of identical pins can be provided in this respect. A buffer function of the buffer station can hereby be provided. A plurality of buffer stations such as are shown in the drawings can, for example, be combined to form a larger buffer station.

An optimization of the cycle times can take place by the use of the buffer station as a buffer since, depending on the gripping positions present at the workpiece and on pre-defined placing positions, the cycle time of the gripping into the container can vary and the pick-up and positioning into a predefined end placement area can be faster than the container removal. The cycle times then have to be coordinated with one another and the buffer station configured in accordance with the present disclosure can act as a buffer and prevent a standstill of the plant or a waiting of the individual operations for one another.

Figure 3:
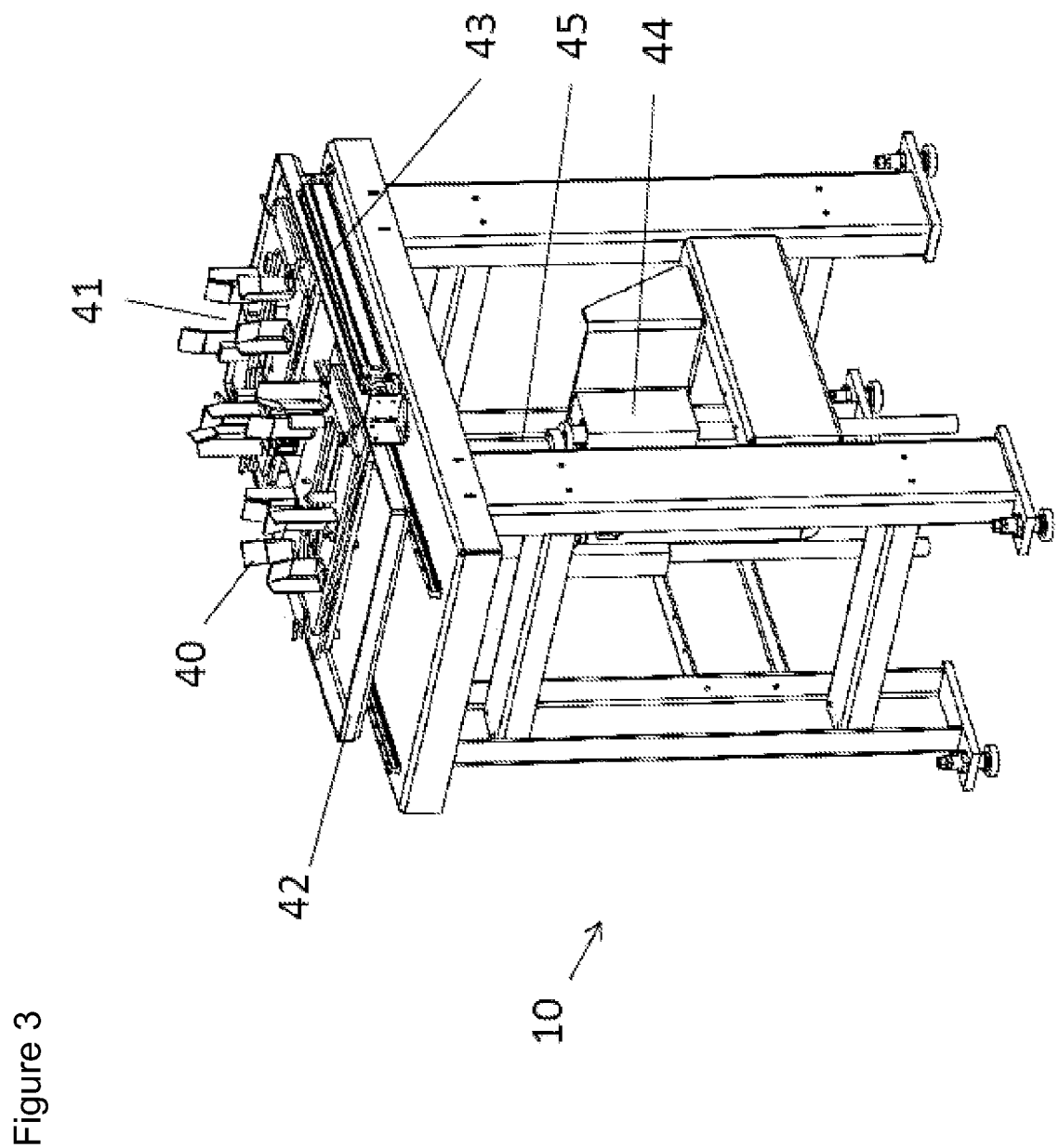
FIG. 3 shows an embodiment of a buffer station used in accordance with the present disclosure.
Figure 4:
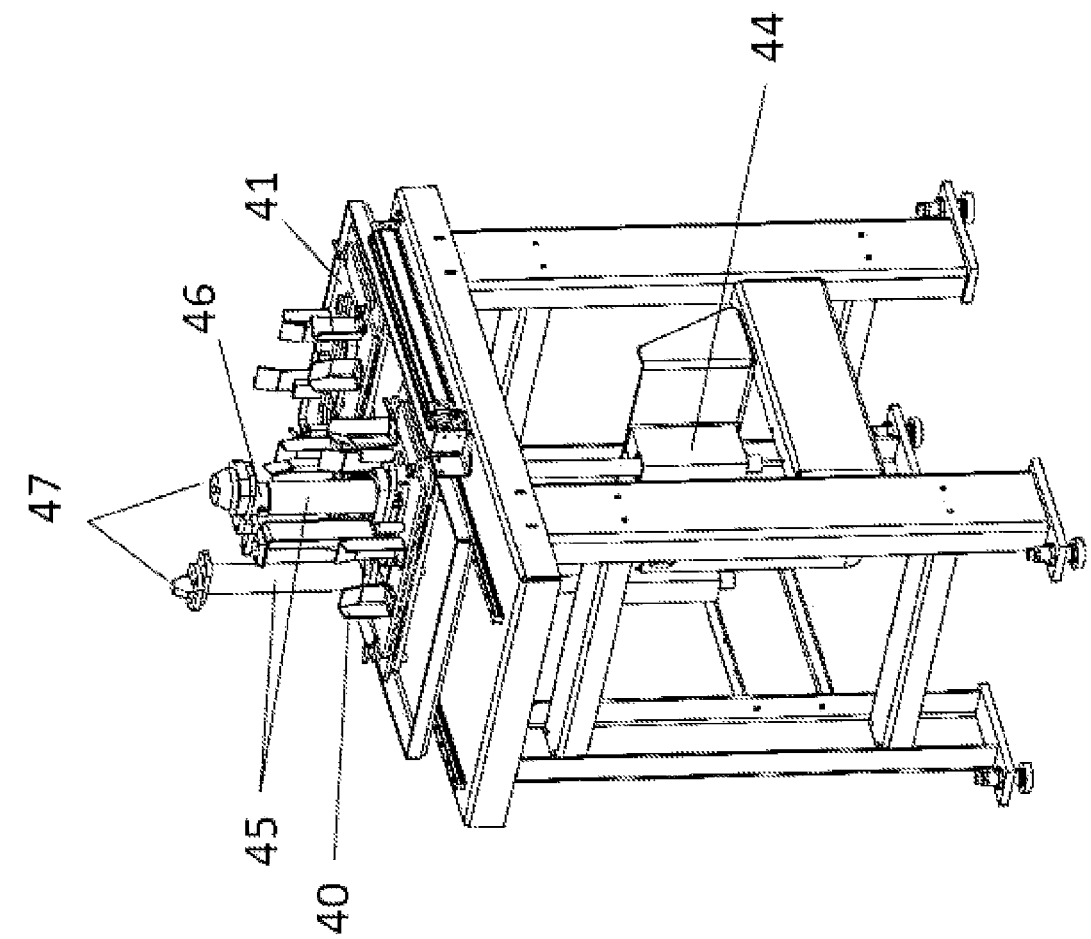
FIG. 4 shows the embodiment shown in FIG. 3 with placing elements set in a different position.

A first embodiment of a buffer station in accordance with the present disclosure is shown in more detail in FIGS. 3 and 4. The embodiment in this respect, on the one hand, has two different nests 40 and 41. They serve to pick up workpieces which were gripped from the upper side or from the lower side. The two different nests are required in this respect because the upper side A of the workpiece is designed differently than the lower side B of the workpiece. Depending on whether the workpiece was now gripped from its upper side A or from its lower side B, it is therefore placed down either in the nest 40 or 41.

If the workpieces are, however, gripped at the side or at the front, a placing down in the nests 40 or 41 is not possible since the gripper would otherwise collide with the nest. The buffer station therefore has two pins 45 on which a workpiece can be placed down. The tips 47 of the pins 45 in this respect grip into the openings of the workpiece and thus likewise allow a precise placing down of the workpieces.

In the embodiment, the two pins 45 are adjustable with respect to one another in their height by an adjustment element 46, in the embodiment a hydraulic cylinder or pneumatic cylinder. Two different workpiece placement areas are hereby provided by the adjustment of the pins with respect to one another, with the one adjustment position of the pins being used for the placing down with the upper side A and the other being used for the placing down with the lower side B.

The workpiece placement area shown in FIGS. 3 and 4 thus allows the placing down of the workpieces in 4 defined placement positions. The association with the gripping regions takes place in this respect such that a placement takes place in the nests or on the pins depending on whether the workpieces are gripped from the top or from the bottom or at the side or at the front. Depending on the alignment at which the gripping takes place between the gripper and the upper side and lower side, the selection then takes place between the two nests or between the two workpiece placement areas provided by the pins.

The buffer placement area in accordance with the present disclosure is designed in this respect such that a change in the placement position of a workpiece placed down on the buffer placement area is possible by moving the placing elements. It is hereby ensured that the workpieces placed down on the buffer placement area can be gripped from the buffer station with a smaller number of permitted gripping positions and optionally with only one or two permitted gripping positions.

In the embodiment, the pins 45 and the nests 40 are designed in this respect such that the pins can be pushed through the base side of the nests via a travel arrangement 44 and can thus raise a workpiece placed down in the nest. In the embodiment, the picking up of the workpieces from the buffer station always takes place in this respect in the position placed down on the pins since an even greater precision can hereby be reached than on the positioning in the nests. It would, however, alternatively also be conceivable to lower the workpieces placed onto the pins into the nests and only to carry out a picking up from the nests.

To allow a raising of the workpieces from the two nests 40 and 41, they are arranged on a carriage 42 in this respect which is travelable on the buffer station via a travel arrangement 43. Each of the two nests 40 and 41 can hereby be traveled over the pins 45. The nests 40 and 41 in this respect have lateral abutment regions via which the workpieces are guided into a fixedly predefined position on the placing into the nests. The base region of the nest is in contrast cut out so that the pins 45 can be led through them.

Figure 5:
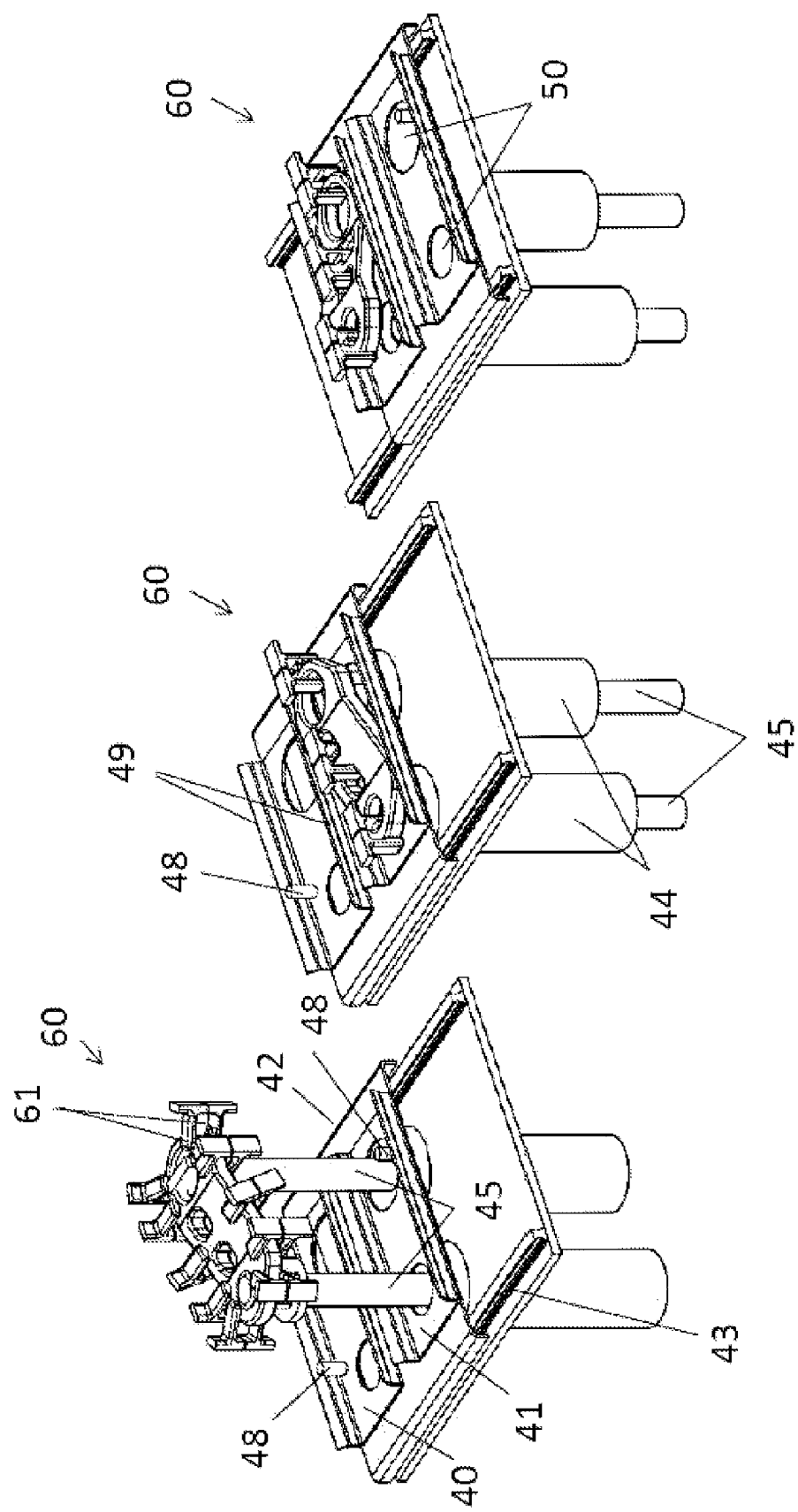
FIG. 5 shows an alternative embodiment for workpiece placement areas in accordance with the present disclosure in three different positions of the placing elements.

A further, slightly modified embodiment of the workpiece placement areas used on the buffer station is shown in three different placement positions in FIG. 5. The three different placement positions are in this respect shown enlarged again in FIGS. 6, 7 and 8.

Two nests 40 and 41 are again also provided in the embodiment shown here which are arranged on a carriage 42 and can be traveled via a travel arrangement 43. The two nests 41 and 42 each have lateral boundary rails 49 which laterally fix the position of the workpieces. A respective placement point 48 is furthermore provided which is arranged on the left side in the nest 40 and on the right side in the nest 41 and on which the part of the workpiece arranged in an elevated position is placed down on the placement on the A side in the nest 41 and on the B side in the nest 40. The openings 50 can furthermore be seen in the base of the nests through which the pins 45 pass.

The pins 45 are each supported in a guide 44 and are vertically adjustable separately therein to be able to raise the workpieces placed down in the nests 40 and 41. The two pins 45 are in this respect raised differently far by changing the relative height of the tips 47 of the pins with respect to one another.

Figure 6:
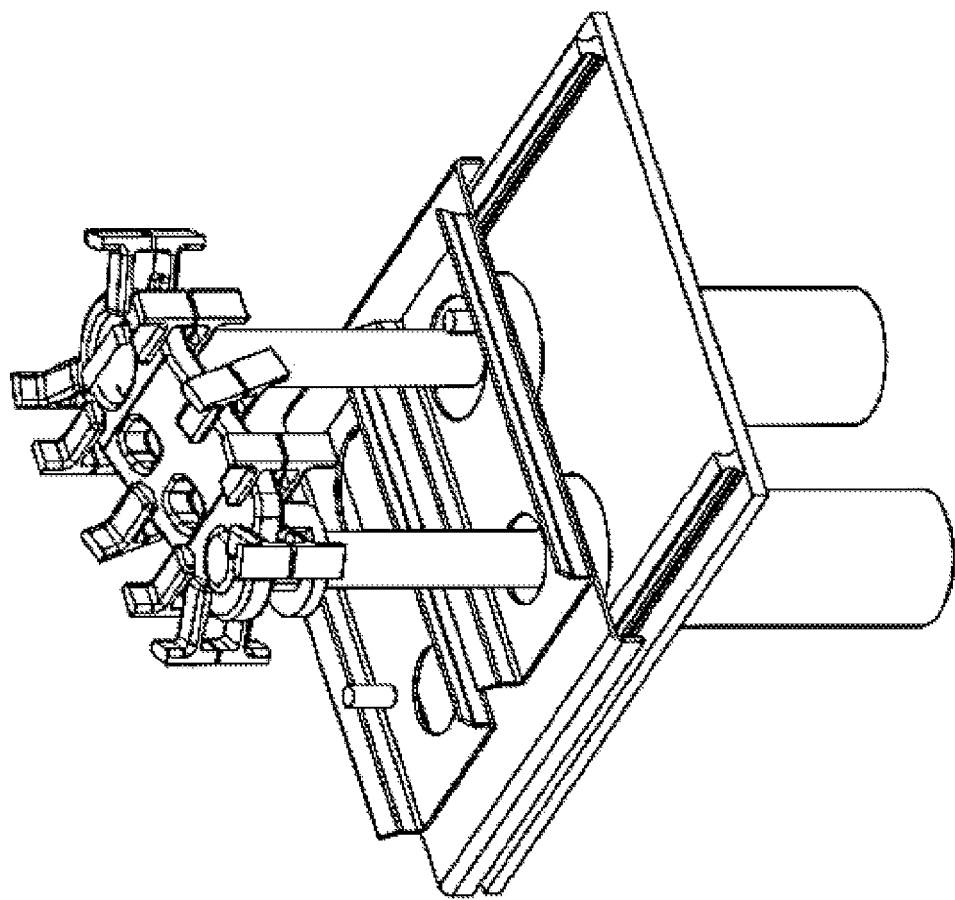
FIG. 6 shows the placement position shown at the left in FIG. 5 for the placing down of workpieces gripped at the side.
Figure 7:
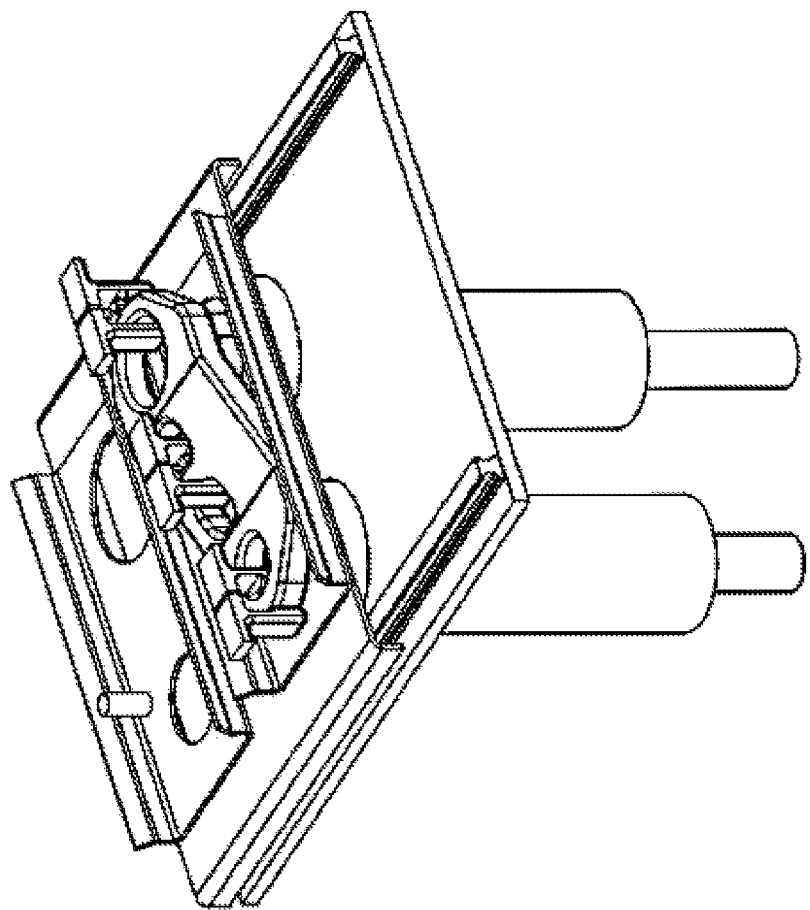
FIG. 7 shows the placement position shown at the center in FIG. 5 for the placing down of workpieces gripped from below, i.e., from side B.
Figure 8:
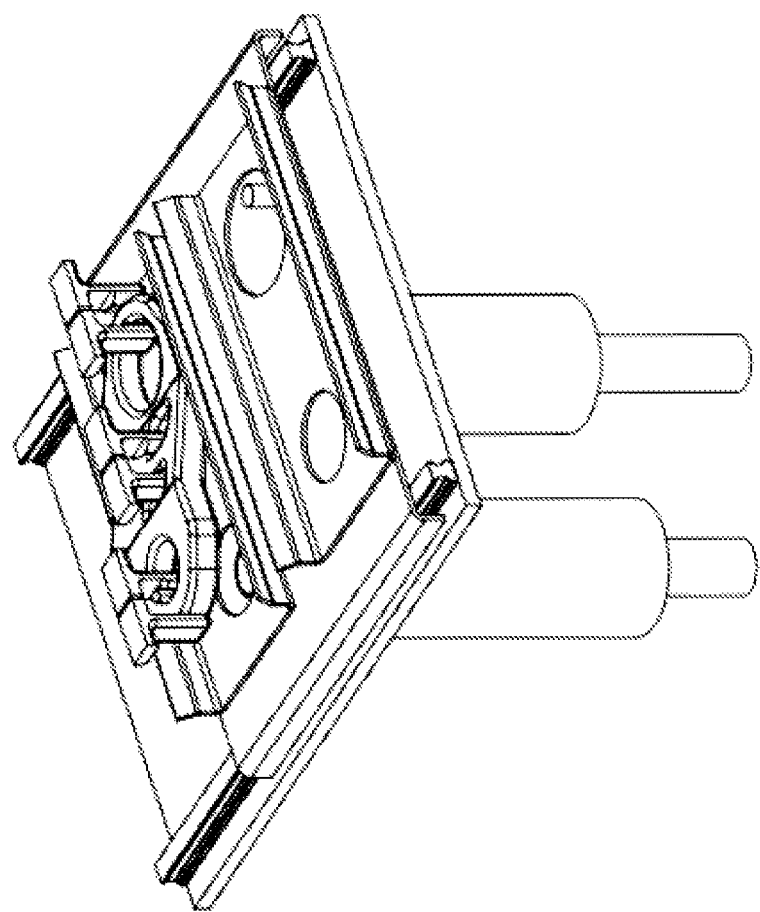
FIG. 8 shows the placement position shown at the right in FIG. 5 for the placing down of workpieces gripped from above, i.e. from side A.

The gripper 60 having the gripping fingers 61 is shown in FIG. 5 and enlarged in FIGS. 6 to 8, and indeed with the respective gripping positions at the workpiece possible for the placing down.

As shown at the left in FIG. 5 and in FIG. 6, a placing down of the workpiece 20 on the pins 45 takes place when it as gripped from the side. The left pin or the right pin is raised higher depending on which side is up in this respect. Alternatively, it would, however, also be conceivable to rotate the workpieces all in the same alignment with the gripper so that placement on the pins is only carried out in one placement position.

As shown in the two right representations in FIG. 5 and FIGS. 7 and 8, a placing down of a workpiece into a nest takes place which was gripped from the top or from the bottom, and indeed depending on the side from which gripping was carried out in the nest 40 or 41.

In accordance with the embodiment, the picking up of the workpieces always takes place in the position placed on the pins shown at the left in FIG. 5 and in FIG. 6. The workpieces placed down into the nests are raised via the pins for this purpose. For this purpose, the respective nest travels over the pins and the pins are traveled upwardly through the openings 50. Depending on the side with which the workpiece was placed down and thus on which of the two nests is above the pins, the left pin or the right pin is raised higher.

In the embodiment, the picking up of the workpieces from the buffer station takes place with at least two permitted gripping points which correspond to the two different alignments of the workpieces (side A or B at the top). As can be seen at the left in FIG. 5, the workpiece is gripped at the side in this respect. However, a placement of the workpieces in the target placement area is possible solely via the movement of the pick-up gripper from these two different gripping positions.

It would alternatively be conceivable to place the workpieces on the buffer placement area again with a changed alignment in order thus to be able to provide a single gripping position for the final picking up from the buffer station.

Depending on the configuration of the workpieces, more nests and/or more pin arrangements or only nests or only pins arrangements can be used in this respect.

Figure 9:
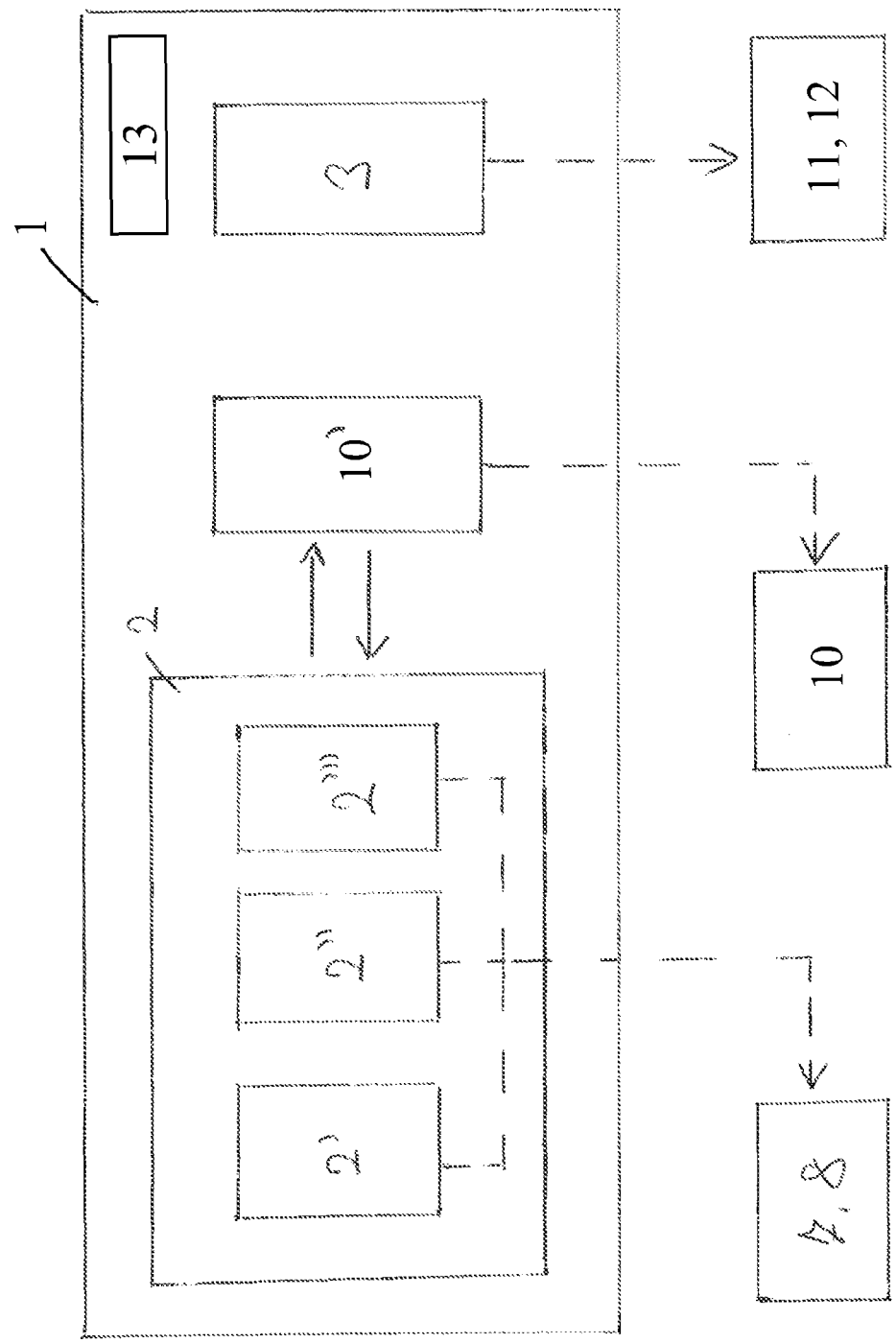
FIG. 9 is an additional system view including the control 1.

FIG. 9 shows an example configuration of the control 1. FIG. 9 illustrates the separation of the control into different units. In one example, different control units may control different steps in the overall routines described herein, or different parts of the machine as described herein. The different may be provided by different control routines and/or by separation of the routines into different and separate control units of the control. One example is the separation of subroutines 2', 2" and 2''', where the individual control units or subroutines independently control the movement of the gripper in three different zones. The separation may help to save cycle time because movement in the first zone can start while the movement in the third zone is still being calculated.

Note that the methods of operation described herein may be carried out by an overall system including, in combination, one or more control units or an overall control, as well as sensor and actuators such as those described herein. The control and/or control units may include instructions for carrying out the various actions and steps described herein, the instructions being non-transitory instructions stored in non-transitory memory, such as memory 13. The sensors may include various sensors including optical vision sensors, position sensors, etc. The actuators may include robot motors, linear motors, rotary motors, electromagnetic actuators, electro-pneumatic actuators, etc.

The invention claimed is:

1. An apparatus for automated removal of workpieces arranged in a container, comprising:
    an object recognition device for detecting the workpieces and a gripper for gripping and removing the workpieces from the container;
    a control for evaluating data from the object recognition device, for path planning, and for controlling the gripper; and
    a buffer station on which the gripper places the workpieces after the removal from the container, wherein the workpieces are picked up from the buffer station by the gripper and are placed down in a target placement area, wherein gripping of the workpieces in the container takes place with a plurality of different permitted gripping positions;
    wherein the buffer station has at least two different workpiece placement areas for the placing down of the workpieces in at least two different, defined placement positions; and
    wherein selection of a workpiece placement area of the buffer station used for the placement takes place on the basis of the gripping position with which the workpiece is or was removed from the container.

2. The apparatus in accordance with claim 1, wherein the selection of the workpiece placement area takes place on the basis of a predefined association between specific gripping positions and specific workpiece placement areas, and in particular via a query in an association table stored in the control.

3. The apparatus in accordance with claim 2, wherein the gripping of the workpieces in the container takes place with a plurality of different permitted gripping points as well as with permitted gripping regions extending about the gripping points; or wherein a collision test takes place in which a check is made with reference to a geometrical model as to whether a collision-free placing down of a workpiece on a workpiece placement area is possible.

4. The apparatus in accordance with claim 1, wherein a picking up of the workpiece from the buffer station takes place with fewer permitted gripping positions than a gripping in the container and with only one gripping position.

5. The apparatus in accordance with claim 1, wherein a same gripper is used for gripping the workpieces from the container and for picking them up from the buffer station; or wherein two separate grippers are used for gripping the workpieces from the container and for picking them up from the buffer station.

6. The apparatus in accordance with claim 1, wherein the gripper for gripping the workpieces in the container or for picking up from the buffer station is a magnetic, pneumatic, or mechanical gripper or is a combination thereof; or wherein the gripper is moved by a gripping arm for the gripping of the workpieces from the container or for the picking up from the buffer station.

7. The apparatus in accordance with claim 1, wherein the picking up of the workpiece from the buffer station is controlled by the control on the basis of a position of the workpiece placement area used for placing down the workpiece known to the control and a shape of the workpiece known to the control and without a previous object recognition of the workpiece on the buffer station.

8. The apparatus in accordance with claim 1, wherein the buffer station comprises an adjustment arrangement having an actuator which allows a change of a position or an alignment of a workpiece placed down on the buffer station or of a placing element; wherein the positional change of the workpiece or of the placing element allows the picking up of the workpiece with a gripping point which was not available at the placement position.

9. The apparatus in accordance with claim 1, wherein a position of at least one of the workpiece placement areas is kinematically adjustable, with the adjustment taking place on the basis of a gripping position with which the workpiece is or was removed from the container.

10. The apparatus in accordance with claim 1, wherein the buffer station has at least one nest into which a workpiece can be placed and has at least one pin on which a workpiece can be placed; wherein the at least one pin is travelable and further allows a raising of a workpiece placed into the nest on the pin or a lowering of a workpiece placed onto the pin into the nest.

11. The apparatus in accordance with claim 1, wherein the buffer station has at least two pins; wherein the two pins are adjustable with respect to one another in order hereby to provide two different workpiece placement areas.

12. The apparatus in accordance with claim 1, having a first control component by which the control of the gripper takes place on the removal of the workpieces from the container and on the placing on the buffer station, wherein the first control component moves the gripper, after the removal of a workpiece from the container, into a predefined transfer position from where further movement of the gripper for placing down on the buffer station takes place; or having a second control component by which the control of the gripper takes place on the picking up from the buffer station and on the placing down on the target placement area, wherein the second control component moves the gripper on one or more predefined tracks stored in the control.

13. The apparatus of claim 1, wherein the at least two workpiece placement areas differ in their configuration and the at least two different placement positions are defined by the configuration of the two workpiece placement areas.

14. An apparatus for automated removal of workpieces arranged in a container, comprising:
    an object recognition device for detecting the workpieces and a gripper for picking and removing the workpieces from the container;
    a control for evaluating data from the object recognition device, for path planning, and for controlling the gripper;
    a buffer station on which the gripper places the workpieces after the removal from the container, wherein the workpieces are picked up from the buffer station by the gripper and are placed down in a target placement area, and wherein the buffer station has at least two different workpiece placement areas for the placing down of the workpieces in at least two different, defined positions; and
    at least one kinematically adjustable placing element, wherein:
        at least two different workpiece placement areas are provided by an adjustment of the placing element;

a workpiece is travelable into a pick-up position by traveling the placing element after the placing down on the buffer station, with workpieces placed into two different workpiece placement areas being travelable into an identical pick-up position; and the placing element releases a gripping point at the workpiece by the traveling.

15. A method for automatic removal of workpieces arranged in a container with an apparatus having an object recognition device for detecting the workpieces, a gripper for picking and removing the workpieces from the container, an electronic control for evaluating data from the object recognition device, for path planning, and for controlling the gripper; and a buffer station on which the gripper places the workpieces after the removal from the container, comprising:

detecting the workpieces;
gripping at least one workpiece using the gripper;
removing the workpiece from the container;
placing down the workpiece on the buffer station; and
gripping the workpiece using the gripper and picking up the workpiece from the buffer station,
wherein gripping of the workpieces in the container takes place with a plurality of different permitted gripping positions;
wherein, after the removal from the container, the workpieces are placed down in at least two different, defined placement positions on the buffer station, wherein the workpieces are placed down in a target placement area; and
wherein selection of a workpiece placement area of the buffer station used for the placement takes place on the basis of the gripping position with which the workpiece is or was removed from the container.

16. The method of claim 15, wherein the method is carried out in combination with the electronic control having instructions stored in non-transitory memory, sensors, and actuators, and wherein the gripping of the workpieces in the container takes place with only a limited set of different permitted gripping positions; wherein the selection of the workpiece placement area of the buffer station used for the placement is based on a determined gripping position with which the workpiece is or was removed from the container; wherein the selection of the workpiece placement area is based on a predefined association between specific gripping positions and specific workpiece placement areas, including a query in an association table stored in the electronic control.

17. The method of claim 15, wherein the gripping of the workpieces in the container takes place with a plurality of different permitted gripping points as well as with permitted gripping regions extending about the gripping points; and wherein a collision test takes place via the electronic control in which a check is made with reference to a geometrical model as to whether a collision-free placing down of a workpiece on a workpiece placement area is possible.

18. The method of claim 15, wherein the picking up of the workpiece from the buffer station is controlled by the electronic control on the basis of a position of the workpiece placement area used for placing down the workpiece known to the electronic control and a shape of the workpiece known to the electronic control and without a previous object recognition of the workpiece on the buffer station.

19. The method of claim 15, wherein the buffer station comprises an adjustment arrangement having an actuator which allows a change of a position or an alignment of a workpiece placed down on the buffer station or of a placing element; and wherein the positional change of the workpiece or of the placing element allows the picking up of the workpiece with a gripping point which was not available at the placement position.

20. The method of claim 15, further comprising kinematically adjusting a position of at least one workpiece placement area, with the adjustment taking place via the electronic control and an actuator based on a gripping position with which the workpiece is or was removed from the container.

21. The method of claim 15, the apparatus having at least one kinematically adjustable placing element, wherein at least one of the following features is provided:

at least two different workpiece placement areas are provided by an adjustment of the placing element;
a workpiece is traveled into a pick-up position by traveling the placing element after the placing down on the buffer station, with workpieces placed into two different workpiece placement areas being travelable into an identical pick-up position; or
the placing element releases a gripping point at the workpiece by the traveling.

22. The method of claim 15, wherein the buffer station has at least two workpiece placement areas for the placing down of the workpiece in the at least two different placement positions, wherein the at least two workpiece placement areas differ in their configuration and the at least two different placement positions are defined by the configuration of the two workpiece placement areas.

* * * * *